United States Patent Office 3,342,617
Patented Sept. 19, 1967

3,342,617
NACREOUS PIGMENT COMPOSITIONS
Julius Jackson, Westfield, N.J., assignor to E. I. du Pont de Nemours and Company, Wilmington, Del., a corporation of Delaware
No Drawing. Filed Aug. 12, 1965, Ser. No. 479,283
13 Claims. (Cl. 106—291)

ABSTRACT OF THE DISCLOSURE

Nacreous flake pigment consisting of a flake substrate (mica) coated with from 10–66% by weight of a thin, translucent layer of a hydrous oxide of a metal (titanium, zirconium, iron and chromium), said pigment being lightfast and stabilized against chemical reactivity by overcoating the pigment with an impervious layer of an insoluble metal pyrophosphate, particularly 5–25% of manganous pyrophosphate, or 3–20% of ferric pyrophosphate, or mixtures thereof.

---

This invention relates to the production of stabilized nacreous pigments and to novel methods for their preparation. More particularly, it relates to new flake pigments comprising a flaky substrate coated with a layer of a hydrous metal oxide, such as titanium dioxide, stabilized by means of an insoluble pyrophosphate, and to methods for manufacture of such stabilized pigments.

The preparation of coated flake or nacreous pigments, the color of which is the result of light interference effects produced by a translucent layer of a selected metal oxide on the surface of a flaky substrate, is already known as described in U.S. Patents 3,087,828 and 3,087,829. In the processes of these patents production of the nacreous pigments is brought about by the controlled deposition on the surface of a translucent flake substrate, such as mica, of a thin, adherent, translucent layer of a hydrous oxide of titanium, zirconium, iron, chromium, or the like, of a particle size below 0.1 micron. Thus, for example, a pale gold colored flake pigment may be obtained by controlled precipitation on the surface of mica of about 0.11 gram of hydrated $TiO_2$ per square meter of mica surface. As the thickness of the interference-producing layer on the flaky substrate is increased progressively, the color of the resulting coated flake pigment is varied in sequence from "silver" to "gold," red violet, blue, green and then to "gold" again, following which the color sequence is repeated. The extremely small particle size hydrous oxide on the surface of such coated flake pigments tends to be highly reactive, with consequent adverse effect on pigment properties. Such reactivity may be manifest in a number of different ways. For example, marked photochemical sensitivity may lead to deficient durability of coating compositions in which the pigment is dispersed, as in the case of flakes coated with hydrous $TiO_2$. Also, chemical reactivity may be observed in certain media, such as plastics containing the commercial "metal phosphite" stabilizers, thus leading to objectionable color development. Furthermore, the hydrous oxide coatings are subject to attack by acid, with consequent alteration of color and loss of film durability. To avoid the objectionable reactivity of the hydrous oxide coatings, the coated flake compositions may be calcined, which process decreases chemical reactivity, increases particle size, decreases water content, and improves lightfastness. However, calcination also alters the color of the product by changing the optical thickness of the layer of oxide, decreases intensity of the resulting interference colors, tends to introduce "milkiness" owing to light scattering by the larger metal oxide particles formed on calcination, and, in the case of inherently colored oxide coatings, also tends to change the color of the oxide. Thus, nacreous pigments with intense interference colors produced following the procedures of U.S. 3,087,828 by coating hydrous $TiO_2$ on mica, show marked photochemical activity which adversely affects the durability of the pigment in certain coating compositions. The photochemical instability may be overcome by high temperature (900–1000° C.) calcination of the product, but the calcined product thus obtained is less intense in color and consequently of decreased value in decorative finishes. Similarly, beautiful golden interference colors may be obtained with mica flakes coated with hydrous ferric oxide following the procedure of U.S. Patent 3,087,-829, but such pigments are sensitive to acids. The acid sensitivity may be decreased by calcination, but the color is also changed, with a decrease in intensity of the interference color. Similar behavior is observed with coatings of other hydrous oxides, such as those of nickel, chromium, vanadium, and the like.

There are other features of the calcination process which tend to detract from its appeal. Thus, for example, the selection of mica as the flake substrate (a choice which may be dictated largely by considerations of cost and availability) may introduce a problem in color standardization which is directly related to the variable chemical composition of the mica. Commercial white wet-ground mica, such as is commonly used in the paint industry, usually contains relatively small amounts of iron, manganese, and other metals, the oxides of which are colored. In the normal use as a paint extender, such mica is easily standardized for color. However, when it is subjected to relatively high temperatures of calcination (900–1000° C.), the color of the mica is markedly affected, the degree of darkening being in general related to the content of metallic ingredients (iron, manganese, etc.), the oxides of which are deeply colored. The extent of color development during calcination is, within the limits of normal operation, roughly proportional to the temperature employed, and in the range of practical procedure a deviation of ±25° C. can be very significant in determining the ultimate color of the mica. It will be readily apparent to those familiar with the operation of rotary kilns, or similar equipment normally used in the commercial calcination of $TiO_2$, that the control of effective operating temperatures within such specified limits in the preferred range poses a problem of no mean proportion.

The foregoing problem of color standardization of calcined mica is readily apparent in the control of color of nacreous flake pigments prepared by the calcination of mica coated with a layer of a hydrous oxide of a metal, such as titanium, zirconium, etc. The degree to which the color change associated with the altered chemical composition of the mica during calcination will effect the color of the calcined oxide coated pigment will depend on the optical character of the oxide coating. If the selection of the latter is such as to promote the attainment of maximum nacreous character, sparkle, luster, etc., then the thickness and the opacity of the coating must be reduced to a minimum consistent with the achievement of the desired color. In other words, the oxide coating must, insofar as possible, permit ready passage of light rays therethrough. It is obvious that this condition will likewise permit the color of the substrate to exert its maximum effectiveness on the color of the ultimate coated flake pigment. Thus, all problems related to the fundamental control of color of the calcined mica substrate per se must ultimately be manifest in the color control of the calcined oxide coated mica flake pigments.

A serious practical problem associated with the calcination process for the preparation of oxide coated nacreous flake pigments is presented by the melting or fusion point of the flake substrate. Where this substrate is glass flake, which may fuse around 800° C., the maximum permissible calcination temperature must be restricted to about 700° C. Yet it is recognized that such a temperature may not be sufficiently high to overcome effectively the photosensitivity of an oxide, such as that of titanium. Subjecting the coated glass flake to a temperature of 900–1000° C., would lead to fusion of the glass and inevitable loss of the particulate flake structure which is essential to the attainment of the desired properties in the product.

It is among the objects of this invention to overcome these and other disadvantages in prior nacreous pigment manufacture and to provide novel and effective methods for obtaining an improved, stabilized form of such pigment. It is among the particular objects of this invention to provide a stabilized hydrous oxide-coated flake pigment with an intense interference color, to provide a light-stable coated flake pigment wherein the coating is hydrous titanium dioxide; to provide an uncalcined hydrous oxide-coated flake pigment which is unreactive toward metal phosphite type plastic stabilizers, to provide a hydrous oxide-coated flake pigment of substantially decreased reactivity to acids and to provide an improved method for the stabilization of hydrous oxide coatings on a flaky substrate, such as mica. A still further object is to provide a deeply colored nacreous flake pigment of good light and chemical stability. Further objects and advantages of the invention will be evident from the ensuing description.

It has now been found that improved nacreous pigments of the type described, for example, in U.S. Patents 3,087,828 and 3,087,829, comprising a flake substrate on the surface of which is a hydrous oxide layer to produce interference colors, can be effectively stabilized without incurring the objectionable effects resulting from calcination heretofore encountered. This is brought about by suitably coating the hydrous oxide treated pigment with a substantially impervious protective layer of an insoluble metal pyrophosphate, especially manganous pyrophosphate or ferric pyrophosphate. As a result extremely lightfast and non-reactive hydrous oxide coated flake pigments with interference color intensity not hitherto attainable in a coated flake pigment are readily obtained, such pigments being readily adaptable for use in a broader range of applications, including paints, plastics, floor coverings, paper coating, and a multitude of other applications known to the pigment-consuming industries.

More specifically, the invention comprises intimately associating with a hydrous oxide-coated pigment substrate, particularly hydrous $TiO_2$-coated mica, an insoluble pyrophosphate of manganese, iron, or various mixtures thereof, in an amount of from 10–66%, and preferably from 3–25% by weight, based on the coated product.

In one particular embodiment, mica which has been previously coated with hydrous $TiO_2$ in accordance with the disclosure of U.S. 3,087,828, is reslurried in water. A solution of a soluble manganous or ferric salt such as a sulfate or nitrate is then added to the slurry and the mixture is heated with agitation in a vat or other suitable vessel to 80–85° C. Subsequent addition of a solution of an alkali metal pyrophosphate, such as sodium pyrophosphate, results in the precipitation of the desired manganous or ferric pyrophosphate coating agent. The product is then isolated by conventional means, such as filtration, washing, drying and pulverization prior to use.

Optionally, the flake pigment thus coated with phosphate can be selectively colored by adsorption thereon of various organic pigment coloring matters to obtain colored nacreous flake pigments having improved lightfastness and chemical stability characteristics. This result can be achieved in a variety of ways. Thus, in the case of pigments which may be acid pasted in concentrated acids, such as sulfuric, polyphosphoric, and the like, whence they are precipitated chemically unaltered by subsequent conventional drowning of their acidic solution in water, the direct drowning of acid solutions of such pigments into the coated flake pigment aqueous slurry can be employed. Among organic pigments useful for coloring the flakes in this manner, phthalocyanines, quinacridones, and certain vat dye pigments can be mentioned. Other than such factors as solubility and chemical stability, which enter into the selection of conditions for the acid pasting of such pigments to effect their physical reduction in particle size, there are no special considerations involved in such applications. Another useful method of coloring the flake with organic coloring matters involves the direct addition of a mill charge consisting of a mixture of such pigment with a water soluble salt (such as may be obtained in the manner disclosed in U.S. 3,030,370) to the aqueous slurry of phosphate coated flake pigment. The water soluble salt is thus removed by solution and the colored pigment is simultaneously adsorbed on the phosphate coated flake substrate. This method of coloring the flake pigment affords certain advantages over acid pasting techniques in that the problems associated with the handling of concentrated acids are avoided and permits the extension of the application to coloring matters which do not lend themselves to processing by the acid pasting technique. In either case, isolation and recovery of the colored flake pigment is conventionally effected, such as through filtration, washing, drying, and pulverization.

The pigments of this invention have their principal value as ingredients of compositions such as paints, printing inks, plastic films, paper coatings, rubber articles, and the like to which they impart desired color and other decorative effects and often exert a profound influence on the durability of such compositions on exposure to the elements. Color and decorative properties of pigments generally refer to compositions containing such pigments which can be prepared as follows and in the indicated, typical formulations:

FORMULATION A—UNSUPPORTED FILM OF CELLULOSE ACETATE

To 20 parts of a cellulose acetate solution containing 16.7% cellulose acetate in acetone is added 1.0 part of pigment. The mixture is stirred until thoroughly mixed. A glass plate is prepared for stripping a film therefrom by coating the clean plate with a silicon stopcock grease and then wiping thoroughly with a dry cloth. The lacquer is spread on the glass plate and drawn down to a wet film thickness of about 0.16 mm. After the solvent has evaporated, the film is stripped from the plate and observed on the smooth side. Such films are conveniently used for lightfastness tests in a "Fade-Ometer."

FORMULATION B—BAKED ACRYLIC LACQUER

|  | Parts |
|---|---|
| Pigment | 2.5 |
| Mixed acrylic ester polymer | 17.9 |
| Butyl benzyl phthalate | 7.7 |
| Mono-acetate of ethylene glycol monoethyl ether | 20.0 |
| Methyl ethyl ketone | 56.9 |
| Toluene | 50.0 |

The pigment is dispersed by vigorous stirring with the resin and plasticizer together with a portion of the solvents for about 15 minutes; the remainder of the solvents is then added and the mixing continued until uniform. Exhibits are prepared by spraying onto primed panels, air drying, and finally baking at 80–85° C. for 20 minutes. Alternatively, as a quick testing method, films of this lacquer may be spread to uniform thickness with a "doctor blade" and observed after air drying.

FORMULATION C—BAKED ALKYD ENAMEL

| | Parts |
|---|---|
| Pigment | 2.5 |
| Non-oxidzing coconut oil-modified alkyd resin solution (60% solids) | 29.2 |
| Modified melamine formaldehyde resin (55% solids) | 13.6 |
| Aromatic hydrocarbon solvent | 15.0 |
| Aliphatic hydrocarbon solvent | 19.0 |

The pigment is added to the mixed resin solutions with a part of the solvent and dispersed by high speed stirring for about 15 minutes, after which the remainder of the solvent is stirred in. The resulting enamel is sprayed onto a primed metal panel and baked one-half hour at about 120° C. Films of uniform thickness may also be applied with a "doctor blade."

FORMULATION D—VINYL PLASTIC FILM

| | Parts |
|---|---|
| Pigment | 3 |
| Vinyl chloride polymer | 100 |
| Dioctyl phthalate | 40 |
| Polyester resin | 10 |
| Stabilizer (barium-cadmium-zinc phosphite) | 3 |
| Stearic acid | 0.25 |

The pigment is added to the mixture of ingredients and the whole mixture is processed on a heated two-roll mill at 155° C. until uniform. It is finally taken from the mill as a sheet of any desired thickness which may be observed as obtained or may be press polished in a suitable heated press.

FORMULATION E—CASEIN PAPER COATING

| | Parts |
|---|---|
| Lactic casein | 1200 |
| Borax ($Na_2B_4O_7 \cdot 10H_2O$) | 48 |
| $Na_3PO_4 \cdot 10H_2O$ | 72 |
| Beta-naphthol | 3 |
| $NH_4OH$ (28% $NH_3$) | 130 |
| Octanol | 60 |

The lactic casein is stirred for 30 minutes with 6,000 parts of cold water. The borax and $Na_3PO_4 \cdot 10H_2O$ are dissolved in 120 parts of water and added to the charge, which is then heated to 15–18° C. The β-naphthol is dissolved in the $NH_4OH$ and added to the charge. Finally, the octanol is introduced, and the charge is mixed thoroughly.

To 25 parts of the casein solution prepared in the above manner are added 25 parts of water and 5 parts of pigment. The suspension is stirred and then screened twice through a 100-mesh screen. Paper coatings are prepared by drawing down over paper with a #24 drawdown rod.

It will be understood that the foregoing compositions are conventional and may be suitably modified in well-known ways or may be replaced as desired by equally conventional compositions including cellulose nitrate lacquers, linseed or other eleoresinous varnishes, linoleum compositions, rubber, polyethylene resins and the like.

To a clearer understanding of the invention the following examples are given. These are merely illustrative of the invention are are not intended to limit its underlying principles and scope. All parts mentioned are by weight, unless otherwise indicated.

Example I

To a stirred solution of 660 parts of titanyl sulfate in water containing 4.4% $TiO_2$ as titanyl sulfate (equivalent to 29 parts $TiO_2$) and with a factor of acidity of 217

(where factor of acidity—a measure of free acid=

$$\frac{100 \text{ (total acid} - \text{combined acid)}}{\text{combined acid (TiOSO}_4)}$$

are added 250 parts of water and 75 parts of waterground mica, commercially available as "Concord Wet Ground Mica 200–325." The mica passes entirely through a 200-mesh sieve and about 94% through a 325-mesh sieve, has a specific surface area of about 3.3 sq. meters per gram as determined by the Brunnauer, Emmett and Teller nitrogen adsorption method, and has an average particle size in the range of 20–40 microns maximum dimension. The slurry thus formed is heated rapidly (about 10 minutes) to the boil and maintained at the boil (with reflux) for about 3½ hours. The product is then isolated by filtering and washing. The yield of product (dry basis) is equivalent to 106 parts.

A quantity of the aqueous presscake prepared as above and equivalent to 100 parts of solids is then slurried in 2000 parts of water. To the stirred slurry is added 8.5 parts of $MnSO_4 \cdot H_2O$, and the charge is heated to 80–85° C. A solution of 6 parts of $Na_4P_2O_7$ in 200 parts of water is added uniformly over a period of 30 minutes while maintaining the temperature of the agitated slurry at 80–85° C. The product is filtered, washed substantially free of soluble salts, and dried at 80–85° C. A yield of 108 parts of manganous pyrophosphate coated nacreous pigment is obtained.

When this pigment is incorporated in the formulations A–E inclusive described above and compared with equivalent formulations containing prior dried uncalcined $TiO_2$-coated mica pigments, it will be found to exhibit vastly superior lightfastness properties.

Example II

A quantity of aqueous presscake prepared as in Example I, paragraph 1, and equivalent to 1000 parts of solids, is slurried in 100,000 parts of water. To this is added a solution of $Fe_2(SO_4)_3$ previously prepared by heating a solution of 234 parts of $FeSO_4 \cdot 7H_2O$, 16.9 parts of $NaClO_3$, 41.2 parts of $H_2SO_4$ (100%) in 1510 parts of water to 80–85° C. and holding at this temperature for 30 minutes. The agitated slurry is heated to 80–85° C. and the pH is recorded (normal 2.4±0.2). To the stirred charge at 80–85° C. is added uniformly over 30 minutes a solution of 159 parts of $Na_4P_2O_7$ dissolved in 20,000 parts of water. The normal pH of the charge is now 3.3±0.2. The product is isolated by filtration, washing and drying in the conventional manner. The dried ferric pyrophosphate coated product is pale gold in color with the yield of product being 1150 parts.

Obviously, other ferric salts (e.g., $FeCl_3 \cdot 6H_2O$) may be substituted in stoichiometrically equivalent amounts for the sulfate employed. The product thus prepared exhibits substantially the same improved lightfastness characteristics over the dry uncalcined $TiO_2$-mica product as are evident in the coated product of Example I.

Example III

Employing the precipitation procedures used in Example I, paragraph 1, to coat the mica flake with a translucent layer of hydrous titanium oxide, a number of runs were made using the quantities of titanyl sulfate solution and mica set forth in the table below to illustrate the variation in color with variation in hydrous $TiO_2$ content per unit area. The mica and titanyl sulfate solution used were the same as those described in Example I. All quantities are in parts by weight. The mica is dispersed in the titanyl sulfate solution, and the resulting mixture is heated to the boil and boiled under reflux for 3½ hours, after which time the product is isolated by filtering and washing in the manner of Example I. The dry product in bulk form when dispersed in a liquid and observed on a dark surface, provided the colors given in the table below.

These colors vary with the amount of hydrous $TiO_2$ coating on the mica flakes:

| | | | | |
|---|---|---|---|---|
| Mica | 100 | 100 | 100 | 100 |
| Titanyl sulfate solution | 772 | 1,160 | 1,600 | 2,440 |
| Equivalent $TiO_2$ | 33 | 50 | 70 | 105 |
| Yield, uncalcined | 135 | 155 | 178 | 210 |
| Hydrated $TiO_2$/square meter (in grams) | 0.11 | 0.17 | 0.24 | 0.34 |
| Color | (¹) | (²) | (³) | (⁴) |

1 Pale gold.
2 Dark gold.
3 Bluish violet.
4 Second order pale gold.

When products of varying hydrous $TiO_2$ content thus prepared are coated with either manganous pyrophosphate or ferric pyrophosphate in the manner described in Examples I and II, respectively, the interference colors which are determined by the thickness of the layer of hydrous $TiO_2$ are preserved, with the same improvement in lightfastness, already noted for the pyrophosphate coated products in comparison with the dry uncalcined $TiO_2$-mica product.

*Example IV*

Blue colored $TiO_2$-glass flakes are prepared by coating glass flakes with hydrous tin oxide and then with hydrous $TiO_2$. The glass flakes used have the following characteristics: Specific surface less than 1 sq. meter per gram, thickness 2–5 microns, sieve analysis:

| Sieve (mesh) | Size in Microns | Wt. Percent |
|---|---|---|
| 40–100 | 149–420 | 12.9 |
| 100–200 | 74–149 | 32.5 |
| 200–325 | 44–74 | 22.0 |
| 325–400 | 32–44 | 9.6 |
| Thru 400 | (¹) | 23.0 |

1 Less than 37.

To a slurry of 250 parts of glass flakes in 2500 parts of water at 15° C. is added 25 parts of crystalline stannous chloride dihydrate ($SnCl_2 \cdot 2H_2O$). The slurry is heated to the boil and boiled for two hours then filtered, washed, and dried at about 80° C. A 25-part portion of these dried flakes is slurried in 250 parts of water, to which is then added 25.8 parts of titanyl sulfate solution (15.5% $TiO_2$, factor of acidity equals 80). The slurry is then boiled for 2 hours, filtered, and the filter cake is washed free of soluble salts and dried to provide a coated glass flake with lustrous sparkle and brilliant blue interference color exhibiting the characteristic photosensitivity of hydrous $TiO_2$ to varying degrees depending on the vehicle system in which it is incorporated. When such coated glass flake product is coated with either manganous pyrophosphate or ferric pyrophosphate in the manner described in Examples I and II, respectively, a pigment product exhibiting excellent lightfastness and which retains the desirable nacre and luster of the composite glass-hydrous $TiO_2$ flake pigment is obtained.

*Example V*

A quantity of aqueous presscake prepared as in Example I, paragraph 1, and equivalent to 100 parts of solids, is slurried in 2,000 parts of water. Sufficient NaOH is added to raise the pH to 6.3±0.2, following which 8.5 parts of $MnSO_4 \cdot H_2O$ is added, and the charge is then heated to 80–85° C. To this is added with stirring over a period of 30 minutes a solution of 6 parts of $Na_4P_2O_7$ in 200 parts of water while maintaining the temperature of the charge at 80–85° C. A solution of 1.2 parts of a polyethoxyethyl aliphatic ether in 50 parts of water is then introduced. To the stirred slurry is added 14.6 parts of a ball-mill discharge, containing approximately 2 parts of gamma-quinacridone in admixture with approximately 12.6 parts of aluminum sulfate [$Al_2(SO_4)_3 \cdot 18H_2O$] prepared by milling in accordance with the procedure of U.S. 3,030,370. The charge is then heated to 89–93° C., held at this temperature for two hours and then isolated by filtering, washing free of soluble sulfate and drying at 80–85° C. The dry pigment product in yield of 110 parts is a pink colored flake which is pulverized prior to use. When incorporated into the various coating composition formulations A to E, inclusive above, it imparts thereto a pleasing nacreous luster of reddish hue and the resulting decorative coating, by comparison with the control counterpart from which the manganous pyrophosphate was omitted, exhibits vastly improved properties in respect to lightfastness and resistance to various chemical agents.

*Example VI*

A quantity of aqueous presscake prepared as in Example I, paragraph 1, and equivalent to 1,000 parts of solids is slurried in 100,000 parts of water. Ferric pyrophosphate is then precipitated on the suspension in accordance with the method outlined in Example II, but the product is retained as a slurry and is not isolated. To the stirred slurry is added gradually a quantity of dry powdered eutectic mixture of polychloro copper phthalocyanine-$AlCl_3$-NaCl (such as is obtained in U.S. 2,833,-782) and containing the equivalent of 20 parts of polychloro copper phthalocyanine. The charge is heated to 89–93° C. and held at this temperature for two hours. The product is isolated by filtering, washing, and drying at 80–85° C. The pigment thus obtained in a yield of 1170 parts is a green colored flake which is pulverized prior to use. When incorporated as an essential pigmenting ingredient in the various applications above it imparts a pleasing nacreous luster of greenish hue to each. The resulting decorative coatings, by comparison with the control counterparts from which the ferric pyrophosphate has been omitted, show remarkably improved lightfastness and resistance to various chemical agents.

*Example VII*

The procedure of Example V is repeated, except that for the ball-mill discharge specified therein is substituted 58 parts of one containing approximately 6 parts of beta-phase copper phthalocyanine in admixture with approximately 52 parts of sodium chloride, prepared by milling in accordance with the procedure of U.S. 2,908,690. The charge is heated and isolated as indicated in Example V. The product obtained is a greenish blue flake pigment in yield of 114 parts which exhibits remarkably improved lightfastness and stability toward chemical reagents.

*Example VIII*

The procedure of Example VII is duplicated, except that for the mill discharge is substituted an acid pasted solution of copper phthalocyanine, separately prepared by stirring 2 parts of copper phthalocyanine powder in 20 parts of concentrated sulfuric acid at 24±5° C. Stirring is continued until solution is complete, as shown by microscopic examination of a sample on a glass slide. The solution is dripped gradually into the stirred flake slurry and the charge is then heated and isolated as indicated in Example V. The product comprises a reddish blue (alpha-phase copper phthalocyanine) flake pigment in yield of 110 parts exhibiting the improved lightfastness and resistance to chemical reagents mentioned above.

*Example IX*

Example V is repeated, except that for the ball-mill discharge specified therein is substituted 120 parts of one containing approximately 12 parts of a solid solution of quinacridone and quinacridonequinone in admixture with 108 parts of sodium chloride. The charge is heated and isolated as indicated in Example V, resulting in the production of 120 parts of a maroon colored flake pigment which, when incorporated in the coating formulations given above, exhibits greatly improved lightfastness and resistance characteristics over formulations containing a prior art dry uncalcined TiO₂-mica product.

In the instant invention the quantity of either manganous or ferric pyrophosphate used can vary within wide limits without departing from the invention. Thus, in the case of manganous pyrophosphate, amounts from about 5–25% by weight of the total pigment composition treated are highly effective, while amounts from about 3–20% by weight of ferric pyrophosphate can be employed to attain the desired improvements in lightfastness and resistance to chemicals. In either case, higher amounts and up to about 50% can be used without incurring any serious adverse effects. However, the use of larger amounts dilutes the flake pigment, detracts from its desirable nacreous luster, and also tends to decrease the flexibility of usage possible in various compositions. Hence, it is preferred to select an amount of pyrophosphate coating at or near the lower limit of the permissible range, consistent with the aim of insuring the desired lightfastness and chemical resistance in the product.

The basic color of the substrate (e.g., mica coated with hydrous TiO₂) will be dependent on the optical thickness of the layer of hydrous TiO₂ or other metal oxide coating present and is the result of light interference. Therefore, the control of this subtle color is achieved by specifying the thickness of the hydrous oxide coating, as described in U.S. 3,087,828. Likewise, the deposition of hydrous TiO₂ on the flake may be achieved by methods other than the hydrolysis of TiOSO₄ as herein described. Thus, for example, the hydrous TiO₂ may be prepared by the hydrolysis of TiCl₄ or of an organic titanate, such as tetrabutyl titanate. In general, any chemical method which is capable of generating hydrous TiO₂ from a compound of titanium and which is adaptable for the purpose of coating a flake particle is contemplated as being useful in the preferred application of the invention.

The process of the invention is applicable not only to flake pigments consisting essentially of glass or mica flakes coated with hydrous TiO₂, but also to flake pigments with a base of other lamellar materials coated with a hydrous TiO₂. Preferably, the flakes have major dimensions within the range of from 1 to 1000 microns; however, the particular flake size is not critical and smaller or larger flakes are applicable to the invention. Since the materials to be coated with the pyrophosphate in accordance with the invention consist of a flaky substrate which is already coated with hydrous TiO₂ so that the latter substantially shields the flake base or substrate and confers on it, with respect to exterior influences, substantially the properties of the hydrous oxide coating, it is this hydrous oxide coating to which the pyrophosphate overcoat is applied. Accordingly, the flaky substrate per se has little contact with the pyrophosphate and the nature of the substrate is not critical with respect to the final coating.

The hydrous oxide-coated flake pigment substrate to be top-coated with the pyrophosphate preferably is finely divided and has a specific surface area of at least 1 sq. meter per gram. The largest dimensions of the particles to be coated are preferably in the range 5 to 100 microns, but particles of as little as one micron size and larger ones of up to a millimeter in size may also be coated and are useful in selected instances. Optimum results are produced when the optical thickness of the hydrous metal oxide is from about 0.4 to 0.7 micron. Such particles as described above are in such a state of subdivision that they can readily be suspended in an aqueous system by stirring.

The beneficial effects of the pyrophosphate treatment appear to be due to the formation on the surface of the hydrous oxide of a relatively impervious transparent skin or coating which effectively shields the hydrous oxide film from the destructive action of chemicals or light, as well as from contact with the dispersion medium in which it may be used. The relatively impervious nature of the pyrophosphate is indicated by the decrease in surface area resulting therefrom.

Wide latitude in the pH of the system during the deposition of the pyrophosphate is permissible. Obviously, extremes in either direction which might tend to solubilize the hydrous TiO₂ are to be avoided, as are extremes which might tend to alter the chemical composition of the precipitated pyrophosphate. The practical range of pH in which the process is operable is from 1 to 8.

In the deposition of the pyrophosphate, temperatures ranging from 80–85° C. have been mentioned in the examples as utilizable. Such temperature range is not critical, however, and can be varied to range from 20 to 100° C. Heating of the slurry of precipitated metal pyrophosphate to 60° C. and within a range of from 40° C. to 100° C. is necessary to confer optimum light stability on the ultimate product.

Concentrations of the slurry may be varied over a wide range. Thus, for example, the ratio of flake to water in the examples may be reduced to one-fifth of that indicated without any detectable effect on the character of the final pigment. The lower limit of concentration is determined largely by such factors as viscosity and stirrability which affect the ease of operation. Dilution beyond the concentrations indicated in the examples is permissible; however, since it does not result in any improvement and since operation at decreased concentration results in increased cost, such deviation from the illustrated procedures is preferably avoided.

The rate at which the pyrophosphate is formed should be such that the major portion thereof is deposited as a coating on the hydrous oxide substrate and very little forms new nuclei, as indicated by a decrease in observed surface area per unit volume of the material being coated. Observations of changes in surface area provide a useful indicator for regulating the process. The rate of formation of the insoluble pyrophosphate can be regulated as desired by control of the rate of heating, rate of addition of pyrophosphate solution, pH, and concentration.

Examples V–IX, inclusive, illustrate the preparation of colored flakes by adsorbing certain chemical dyestuffs or pigments on the pyrophosphate treated flake substrate; however, it will be understood that a much broader selection of coloring matters is possible. In general, any organic colored pigment which may be solubilized or dispersed in such manner as to render it capable of regeneration into very small particles and readily adsorbable on the pyrophosphate can be used. Thus, in addition to pigments of the quinacridone and phthalocyanine series mentioned, the following azo pigments can be included as useful for salt-milling in accordance with the techniques of Example V and adsorbed on the flake substrate, provided the conditions (pH, temperature, etc.) are such as to preclude decomposition of the azo compound:

| | Colour Index No. |
|---|---|
| Toluidine Red | 12120 |
| Para Red | 12070 |
| Naphthol Red | 12390 |
| Pyrazolone Red | 21120 |
| Naphthol Red, Blue Shade | 12355 |
| Toluidine Maroon | 12350 |
| Permanent Red 2B (manganese) | 15865 |
| BON Maroon (calcium) | 15880 |
| Dinitraniline Orange | 12075 |
| Benzidine Orange | 21110 |
| Hansa Orange | 11725 |
| Azo Yellow, nickel chelate | 12775 |
| Benzidine Yellow | 21095 |
| Hansa Yellow 10G | 11710 |

Likewise, various vat dye pigments, including the following, can be incorporated on the surface of the flake substrate through utilization of the salt-milling techniques above mentioned or (where the stability of the coloring matter permits) the acid pasting technique of Example VIII:

| | Colour Index No. |
|---|---|
| Indanthrone Blue | 69825 |
| Isoviolanthrone Violet | 60010 |
| Thioindigo Red | 73310 |
| Oxazole Red | 67000 |
| Perylene Scarlet | 71140 |
| Anthanthrone Orange | 59300 |
| Vat Orange GR | 71105 |
| Flavanthrone Yellow | 70600 |
| Anthrapyrimidine Yellow | 68420 |

As already indicated, the invention enables one to prepare improved hydrous oxide-coated flake pigments of increased stability and particularly lightfast nacreous pigments containing mica flake with a layer of hydrous titanium dioxide thereon. Thus, intense violet, blue, green, and red colored pigments of this type with excellent lightfastness can be obtained. Previously, the calcination required to insure lightfastness in these oxide-coated pigments markedly impaired their tinctorial intensity. Uncalcined hydrous $TiO_2$ is especially susceptible to rapid attack by strong acids, so that flake pigments coated therewith disadvantageously exhibit undesired resistance to attack by such acids. For example, on exposure in atmospheres containing traces of sulfur oxides, such pigments may fail because of acid attack. Another advantage results from the decreased reactivity of hydrous titanium dioxide with commonly used metal phosphite plastic stabilizers following pyrophosphate coating. Uncalcined hydrous titanium dioxide coated on a flake substrate produces a marked yellow coloration when the flake pigment is dispersed in polyvinyl chloride stabilized with the metal phosphite stabilizers which are widely used therewith. Such yellow coloration effectively bars the use of the hydrous titanium dioxide-coated pigment in such systems. The present invention overcomes this problem by the preferred application of a coating of manganous or ferric pyrophosphate on top of the hydrous titanium dioxide treated flake pigment.

Employment of the contemplated pyrophosphates which are relatively transparent, results in minimum impairment of desirable pigment properties such as nacre, sparkle, luster, etc., characteristic of the original uncalcined hydrous $TiO_2$ coated flake pigment. Furthermore, both the manganous and ferric pyrophosphate act as excellent buffers to further enhance their protective action against attack of the hydrous $TiO_2$ by acids. In addition, the preparation of deeply colored flakes by treatment with organic coloring matters in the case of the pyrophosphate coated flakes permits attainment of a much greater depth of color. The combination of these advantages over the properties of prior art products clearly indicates the markedly improved decorative possibilities attainable with the products of this invention over prior products.

A further advantage afforded by the process of this invention is its attractiveness from an economic standpoint over prior art procedures in which calcination of the hydrous $TiO_2$ to anhydrous $TiO_2$ is required. Such calcination requires the use of special equipment and is time consuming and costly. In addition, the calcination treatment invariably leads to significant aggregation of some of the product, a degree of hold-up in the kiln, and undesired variations in color and physical character of the calciner discharge. Also, periodic shutdowns for calciner clean-out are encountered, a process which is dictated not only by the desirability of avoiding contamination of products of different type but also to maintain the kiln in a satisfactory state of operating efficiency. All of these considerations are reflected in increased cost attributable to the calcination. The present invention completely eliminates these time-consuming, costly operations and need for calcination, and thus effectively circumvents all of these incremental cost factors.

As already noted, the pyrophosphate treated products of this invention containing particularly a thin, adherent, translucent layer of a colorless hydrous titanium or zirconium oxide of a selected small particle size, substantially all of which are less than 0.1 micron, and said layer having a thickness of about 20–250 millimicrons, and preferably in the range of 20 to 155 millimicrons, are useful as pigmenting ingredients in various compositions where their decorative and aesthetic properties confer desirable characteristics to the pigmented composition. Included among such compositions are paints, printing inks, plastics, rubber and coatings for paper, as well as any others in which the conditions of pigmentation and fabrication would be compatible with the character and stability of the new flake pigments. As disclosed in U.S. 3,087,828, the basic pigment can, if desired, consist essentially of translucent micaceous flakes having on the surface thereof translucent, successive layers of metal oxides, the first layer being a layer of 10–66% by weight of the total pigment of a metal oxide consisting of hydrous $TiO_2$ or $ZrO_2$ particles on which layer is superimposed at least one layer of a different metal oxide selected from the group consisting of $TiO_2$, $ZrO_2$, $Al_2O_3$, $ZnO$, $Sb_2O_3$, $SnO_2$, $Fe_2O_3$, $CuO$, $NiO$, $CoO$, and $Cr_2O_3$ and the hydrous forms of these oxides, said different metal oxides being less than 0.1 micron in particle size and present in amounts ranging from 0.5 to 20% by weight of the metal oxide in the first layer.

I claim:

1. A stabilized, light-fast, non-reactive nacreous flake pigment composition consisting essentially of a flake substrate coated with a hydrous metal oxide layer having a thickness of from 20–250 millimicrons and on which an impervious, transparent coating of from 3–66%, by weight, based on the total weight of the pigment of an insoluble metal pyrophosphate selected from the group consisting of manganous and ferric pyrophosphate is superimposed.

2. The product of claim 1 wherein the pyrophosphate coating is manganous pyrophosphate.

3. The product of claim 1 wherein the pyrophosphate coating is ferric pyrophosphate.

4. The product of claim 1 wherein the flake substrate is mica.

5. The product of claim 1 wherein the flake substrate is glass.

6. A stabilized, light-fast, non-reactive colored nacreous flake pigment composition consisting essentially of a flake substrate successively coated with a 20–250 millimicrons-thick layer of hydrous titanium dioxide and an impervious, transparent coating of from 3–66%, by weight, based on the total weight of the pigment of an insoluble metal pyrophosphate selected from the group consisting of manganous and ferric pyrophosphate.

7. The product of claim 6 wherein the flake substrate is mica and the pyrophosphate is manganous pyrophosphate present in an amount ranging from 5–25%, by weight, based on the total weight of the pigment.

8. The product of claim 6 wherein the flake substrate is mica and the pyrophosphate is ferric pyrophosphate present in an amount ranging from 3–20%, by weight, based on the total weight of the pigment.

9. The product of claim 6 wherein an organic coloring matter is intimately associated therewith.

10. A process for producing a stable nacreous flake pigment coated with a 20–250 millimicrons-thick layer of hydrous titanium dioxide on a flake substrate which comprises precipitating on said coated pigment at a temperature ranging from 20–100° C. and a pH of from 1–8, an impervious, transparent layer of from 5–25%, by weight, based on the total weight of the pigment of manganous pyrophosphate.

11. A process for producing a stable nacreous flake pigment coated with a 20–250 millimicrons-thick layer of hydrous titanium dioxide on a flake substrate, which comprises precipitating on said pigment at a temperature ranging from 20–100° C. and a pH of from 1–8, an impervious, transparent layer of from 3–20%, by weight, based on he total weight of the pigment, of ferric pyrophosphate.

12. A process for preparing a colored stable nacreous flake pigment which comprises depositing on a flake substrate succesive layers of a 20–250 millimicrons-thick hydrous titanium dioxide, from 3–66%, by weight, based on the total weight of the pigment, of an impervious, transparent coating of a product selected from the group consisting of manganous pyrophosphate and ferric pyrophosphate, and an organic coloring matter, said pyrophosphate layer having been deposited on said hydrous titanium dioxide coated flake pigment by precipitation from a slurry mixture of said pigment with a solution of a pyrophosphate salt while at a temperature ranging from 20–100° C. and a pH of from 1–8.

13. The process of claim 10 wherein the flake substrate is mica.

References Cited
UNITED STATES PATENTS

| | | | |
|---|---|---|---|
| 3,087,827 | 4/1963 | Klenke et al. | 106—291 |
| 3,087,828 | 4/1963 | Linton | 106—291 |
| 3,087,829 | 4/1963 | Linton | 106—291 |
| 3,127,280 | 3/1964 | Whatley | 106—308 |

TOBIAS E. LEVOW, *Primary Examiner.*

J. E. POER, *Assistant Examiner.*